(12) United States Patent
Moore

(10) Patent No.: US 8,832,033 B2
(45) Date of Patent: *Sep. 9, 2014

(54) USING RSS ARCHIVES

(76) Inventor: James F Moore, Cambridge, MA (US)

( * ) Notice: Subject to any disclaimer, the term of this patent is extended or adjusted under 35 U.S.C. 154(b) by 3 days.

This patent is subject to a terminal disclaimer.

(21) Appl. No.: 13/396,966

(22) Filed: Feb. 15, 2012

(65) Prior Publication Data

US 2012/0150813 A1 Jun. 14, 2012

Related U.S. Application Data

(63) Continuation of application No. 12/233,266, filed on Sep. 18, 2008, now Pat. No. 8,140,482.

(60) Provisional application No. 61/082,802, filed on Jul. 22, 2008, provisional application No. 60/973,480, filed on Sep. 19, 2007.

(51) Int. Cl.
*G06F 7/00* (2006.01)
*G06F 17/00* (2006.01)

(52) U.S. Cl.
USPC .......................................... 707/661; 707/667

(58) Field of Classification Search
USPC .................. 707/661, 664, 665, 667, 668
See application file for complete search history.

(56) References Cited

U.S. PATENT DOCUMENTS

| | | |
|---|---|---|
| 5,664,109 A | 9/1997 | Johnson et al. |
| 5,758,095 A | 5/1998 | Albaum et al. |
| 5,784,635 A | 7/1998 | McCallum |
| 5,845,255 A | 12/1998 | Mayaud |
| 5,930,764 A | 7/1999 | Melchione et al. |
| 5,931,946 A | 8/1999 | Terada et al. |
| 5,933,136 A | 8/1999 | Brown |
| 6,022,315 A | 2/2000 | Iliff |
| 6,029,195 A | 2/2000 | Herz |
| 6,070,189 A | 5/2000 | Bender et al. |
| 6,131,085 A | 10/2000 | Rossides |
| 6,163,774 A | 12/2000 | Lore et al. |
| 6,199,082 B1 | 3/2001 | Ferrel et al. |
| 6,233,618 B1 | 5/2001 | Shannon |
| 6,253,210 B1 | 6/2001 | Smith et al. |
| 6,311,194 B1 | 10/2001 | Sheth et al. |

(Continued)

FOREIGN PATENT DOCUMENTS

| | | |
|---|---|---|
| DE | 226868 | 9/1984 |
| DE | 4434369 A1 | 3/1996 |

(Continued)

OTHER PUBLICATIONS

"Customer", Roget's II The New Thesaurus. Boston: Houghton Mifflin. Credo Reference. [online][retrieved on Jul. 10, 2011], 2003, 1 page.

(Continued)

*Primary Examiner* — Tony Mahmoudi
*Assistant Examiner* — Merilyn Nguyen
(74) *Attorney, Agent, or Firm* — GTC Law Group LLP & Affiliates

(57) ABSTRACT

In some aspects, at least two different probes are applied to datafeed archives to derive information based on data in the archives. The probes are part of a probe plan to determine a result based on the derived information. The result is determined based on the derived information.

19 Claims, 3 Drawing Sheets

(56) References Cited

U.S. PATENT DOCUMENTS

| | | |
|---|---|---|
| 6,442,333 B1 | 8/2002 | Izawa |
| 6,484,182 B1 | 11/2002 | Dunphy et al. |
| 6,551,243 B2 | 4/2003 | Bocionek et al. |
| 6,598,161 B1 | 7/2003 | Kluttz et al. |
| 6,678,764 B2 | 1/2004 | Parvulescu et al. |
| 6,693,947 B1 | 2/2004 | Schroeder |
| 6,732,080 B1 | 5/2004 | Blants |
| 6,734,886 B1 | 5/2004 | Hagan et al. |
| 6,804,656 B1 | 10/2004 | Rosenfeld et al. |
| 6,904,461 B1 | 6/2005 | Randhava et al. |
| 6,931,532 B1 | 8/2005 | Davis et al. |
| 6,954,532 B1 | 10/2005 | Handley et al. |
| 6,961,858 B2 | 11/2005 | Fransdonk |
| 6,993,522 B2 | 1/2006 | Chen et al. |
| 7,010,681 B1 | 3/2006 | Fletcher et al. |
| 7,020,635 B2 | 3/2006 | Hamilton et al. |
| 7,058,710 B2 | 6/2006 | McCall et al. |
| 7,072,934 B2 | 7/2006 | Helgeson et al. |
| 7,080,049 B2 | 7/2006 | Truitt et al. |
| 7,090,128 B2 | 8/2006 | Farley et al. |
| 7,107,462 B2 | 9/2006 | Fransdonk |
| 7,117,504 B2 | 10/2006 | Smith et al. |
| 7,127,328 B2 | 10/2006 | Ransom |
| 7,142,691 B2 | 11/2006 | Levy |
| 7,146,415 B1 | 12/2006 | Doi et al. |
| 7,149,813 B2 | 12/2006 | Flanagin et al. |
| 7,150,045 B2 | 12/2006 | Koelle et al. |
| 7,188,144 B2 | 3/2007 | Fuisz |
| 7,269,664 B2 | 9/2007 | Hutsch et al. |
| 7,296,077 B2 | 11/2007 | Harmon et al. |
| 7,302,567 B2 | 11/2007 | Hearn et al. |
| 7,308,477 B1 | 12/2007 | Gress et al. |
| 7,406,427 B1 | 7/2008 | Guyan et al. |
| 7,412,534 B2 | 8/2008 | Tsang et al. |
| 7,421,155 B2 * | 9/2008 | King et al. .................... 382/312 |
| 7,451,147 B1 | 11/2008 | Kao et al. |
| 7,472,349 B1 | 12/2008 | Srivastava et al. |
| 7,519,591 B2 | 4/2009 | Landi et al. |
| 7,565,410 B2 | 7/2009 | Stickler |
| 7,584,208 B2 | 9/2009 | Spivack et al. |
| 7,587,502 B2 | 9/2009 | Crawford et al. |
| 7,620,606 B2 | 11/2009 | Gentry et al. |
| 7,711,586 B2 | 5/2010 | Aggarwal et al. |
| 7,865,511 B2 * | 1/2011 | Kahn et al. .................... 707/758 |
| 7,904,367 B2 | 3/2011 | Chung et al. |
| 7,949,666 B2 | 5/2011 | Wolff et al. |
| 7,953,725 B2 | 5/2011 | Burris et al. |
| 8,010,282 B2 | 8/2011 | Barry et al. |
| 8,140,482 B2 | 3/2012 | Moore |
| 8,200,700 B2 | 6/2012 | Moore et al. |
| 8,200,775 B2 | 6/2012 | Moore |
| 8,316,005 B2 | 11/2012 | Moore |
| 8,347,088 B2 | 1/2013 | Moore et al. |
| 8,566,115 B2 | 10/2013 | Moore |
| 8,700,738 B2 | 4/2014 | Moore et al. |
| 2001/0016851 A1 | 8/2001 | Gramsamer et al. |
| 2001/0051881 A1 | 12/2001 | Filler |
| 2001/0052933 A1 | 12/2001 | Nybo et al. |
| 2001/0056359 A1 | 12/2001 | Abreu |
| 2002/0010616 A1 | 1/2002 | Itzhaki |
| 2002/0010764 A1 | 1/2002 | Spicer |
| 2002/0029157 A1 | 3/2002 | Marchosky |
| 2002/0032742 A1 | 3/2002 | Anderson |
| 2002/0038316 A1 | 3/2002 | Onyon et al. |
| 2002/0049614 A1 | 4/2002 | Rice et al. |
| 2002/0059049 A1 | 5/2002 | Bradbury et al. |
| 2002/0059399 A1 | 5/2002 | Learmonth |
| 2002/0091734 A1 | 7/2002 | Redlich et al. |
| 2002/0138467 A1 | 9/2002 | Jacobson et al. |
| 2002/0143742 A1 | 10/2002 | Nonomura et al. |
| 2002/0143819 A1 | 10/2002 | Han et al. |
| 2002/0152210 A1 | 10/2002 | Johnson et al. |
| 2002/0152318 A1 | 10/2002 | Menon et al. |
| 2002/0154178 A1 | 10/2002 | Barnett et al. |
| 2002/0157023 A1 | 10/2002 | Callahan et al. |
| 2002/0188522 A1 | 12/2002 | McCall et al. |
| 2003/0046434 A1 | 3/2003 | Flanagin et al. |
| 2003/0050801 A1 | 3/2003 | Ries et al. |
| 2003/0055818 A1 | 3/2003 | Faybishenko et al. |
| 2003/0055825 A1 | 3/2003 | Chen et al. |
| 2003/0061404 A1 | 3/2003 | Atwal et al. |
| 2003/0069751 A1 | 4/2003 | Lichtenstein et al. |
| 2003/0074352 A1 | 4/2003 | Raboczi et al. |
| 2003/0088544 A1 | 5/2003 | Kan et al. |
| 2003/0088784 A1 | 5/2003 | Ginter et al. |
| 2003/0126120 A1 | 7/2003 | Faybishenko et al. |
| 2003/0217047 A1 | 11/2003 | Marchisio |
| 2003/0225718 A1 | 12/2003 | Shmulevich et al. |
| 2003/0229692 A1 | 12/2003 | Vo |
| 2004/0002966 A1 | 1/2004 | Perkowski |
| 2004/0034550 A1 | 2/2004 | Menschik et al. |
| 2004/0054675 A1 | 3/2004 | Li |
| 2004/0054722 A1 | 3/2004 | Defloor et al. |
| 2004/0064428 A1 | 4/2004 | Larkin et al. |
| 2004/0073661 A1 | 4/2004 | Eibach et al. |
| 2004/0078231 A1 | 4/2004 | Wilkes et al. |
| 2004/0078236 A1 | 4/2004 | Stoodley et al. |
| 2004/0093412 A1 | 5/2004 | Chen et al. |
| 2004/0133580 A1 | 7/2004 | Liu et al. |
| 2004/0139317 A1 | 7/2004 | Fronberg |
| 2004/0139327 A1 | 7/2004 | Brown et al. |
| 2004/0143623 A1 | 7/2004 | Fukui et al. |
| 2004/0172423 A1 | 9/2004 | Kaasten et al. |
| 2004/0181679 A1 | 9/2004 | Dettinger et al. |
| 2004/0199765 A1 | 10/2004 | Kohane et al. |
| 2004/0207659 A1 | 10/2004 | Goodman et al. |
| 2004/0221226 A1 | 11/2004 | Lin et al. |
| 2004/0224674 A1 | 11/2004 | O'farrell et al. |
| 2004/0230674 A1 | 11/2004 | Pourheidari et al. |
| 2004/0254816 A1 | 12/2004 | Myers |
| 2004/0260767 A1 | 12/2004 | Kedem et al. |
| 2004/0267610 A1 | 12/2004 | Gossett et al. |
| 2005/0027567 A1 | 2/2005 | Taha |
| 2005/0027871 A1 | 2/2005 | Bradley et al. |
| 2005/0038717 A1 | 2/2005 | McQueen, III et al. |
| 2005/0055308 A1 | 3/2005 | Meyer et al. |
| 2005/0108057 A1 | 5/2005 | Cohen et al. |
| 2005/0117527 A1 | 6/2005 | Williams et al. |
| 2005/0120300 A1 | 6/2005 | Schwager et al. |
| 2005/0132048 A1 | 6/2005 | Kogan et al. |
| 2005/0160065 A1 | 7/2005 | Seeman |
| 2005/0165615 A1 | 7/2005 | Minar |
| 2005/0198021 A1 * | 9/2005 | Wilcox et al. .................... 707/3 |
| 2005/0203917 A1 | 9/2005 | Freeberg et al. |
| 2005/0216315 A1 | 9/2005 | Andersson |
| 2005/0234740 A1 | 10/2005 | Krishnan et al. |
| 2005/0262340 A1 | 11/2005 | Rabb |
| 2005/0267973 A1 | 12/2005 | Carlson et al. |
| 2005/0289468 A1 | 12/2005 | Kahn et al. |
| 2006/0004691 A1 | 1/2006 | Sifry |
| 2006/0004764 A1 | 1/2006 | Kurhekar et al. |
| 2006/0010251 A1 | 1/2006 | Mrsic-flogel et al. |
| 2006/0052089 A1 | 3/2006 | Khurana et al. |
| 2006/0053156 A1 | 3/2006 | Kaushansky et al. |
| 2006/0059208 A1 | 3/2006 | Chen et al. |
| 2006/0064320 A1 | 3/2006 | Postrel |
| 2006/0064326 A1 | 3/2006 | Tucker |
| 2006/0073812 A1 | 4/2006 | Punaganti Venkata et al. |
| 2006/0074980 A1 | 4/2006 | Sarkar |
| 2006/0075426 A1 | 4/2006 | Koch et al. |
| 2006/0080166 A1 | 4/2006 | Takahashi |
| 2006/0085412 A1 | 4/2006 | Johnson et al. |
| 2006/0085788 A1 | 4/2006 | Amir et al. |
| 2006/0095507 A1 | 5/2006 | Watson |
| 2006/0095628 A1 | 5/2006 | Ludwig et al. |
| 2006/0101035 A1 | 5/2006 | Mustakallio et al. |
| 2006/0106655 A1 | 5/2006 | Lettovsky et al. |
| 2006/0106748 A1 | 5/2006 | Chafle et al. |
| 2006/0111938 A1 | 5/2006 | Vitiello |
| 2006/0112076 A1 | 5/2006 | Burris et al. |
| 2006/0129445 A1 | 6/2006 | McCallum |
| 2006/0136259 A1 | 6/2006 | Weiner et al. |
| 2006/0149591 A1 | 7/2006 | Hanf et al. |
| 2006/0155698 A1 | 7/2006 | Vayssiere |

(56) References Cited

U.S. PATENT DOCUMENTS

| | | |
|---|---|---|
| 2006/0167860 A1 | 7/2006 | Eliashberg et al. |
| 2006/0173985 A1 | 8/2006 | Moore |
| 2006/0178910 A1 | 8/2006 | Eisenberger et al. |
| 2006/0178918 A1 | 8/2006 | Mikurak |
| 2006/0184617 A1 | 8/2006 | Nicholas et al. |
| 2006/0188327 A1 | 8/2006 | Moon |
| 2006/0200380 A1 | 9/2006 | Ho et al. |
| 2006/0200478 A1 | 9/2006 | Pasztor et al. |
| 2006/0221076 A1 | 10/2006 | Takahashi et al. |
| 2006/0229911 A1 | 10/2006 | Gropper et al. |
| 2006/0230011 A1 | 10/2006 | Tuttle et al. |
| 2006/0230021 A1 | 10/2006 | Diab et al. |
| 2006/0230221 A1 | 10/2006 | Hsu et al. |
| 2006/0247961 A1 | 11/2006 | Klemow |
| 2006/0265489 A1 | 11/2006 | Moore |
| 2006/0265508 A1 | 11/2006 | Angel et al. |
| 2006/0288011 A1 | 12/2006 | Gandhi et al. |
| 2006/0288329 A1 | 12/2006 | Gandhi et al. |
| 2007/0011665 A1 | 1/2007 | Gandhi et al. |
| 2007/0011710 A1 | 1/2007 | Chiu |
| 2007/0027710 A1 | 2/2007 | Mohr |
| 2007/0038712 A1 | 2/2007 | Affronti et al. |
| 2007/0050446 A1 | 3/2007 | Moore |
| 2007/0061266 A1 | 3/2007 | Moore |
| 2007/0061393 A1* | 3/2007 | Moore .................... 709/201 |
| 2007/0061487 A1 | 3/2007 | Moore et al. |
| 2007/0073934 A1 | 3/2007 | Rogers |
| 2007/0079237 A1 | 4/2007 | Abrams et al. |
| 2007/0081550 A1 | 4/2007 | Moore |
| 2007/0088807 A1 | 4/2007 | Moore |
| 2007/0094156 A1 | 4/2007 | Isaacs |
| 2007/0094350 A1 | 4/2007 | Moore |
| 2007/0094365 A1 | 4/2007 | Nussey et al. |
| 2007/0094389 A1 | 4/2007 | Nussey et al. |
| 2007/0100959 A1 | 5/2007 | Eichstaedt et al. |
| 2007/0106536 A1 | 5/2007 | Moore |
| 2007/0106537 A1 | 5/2007 | Moore |
| 2007/0106649 A1 | 5/2007 | Moore |
| 2007/0106650 A1 | 5/2007 | Moore |
| 2007/0106750 A1 | 5/2007 | Moore |
| 2007/0106751 A1 | 5/2007 | Moore |
| 2007/0106752 A1 | 5/2007 | Moore |
| 2007/0106753 A1 | 5/2007 | Moore |
| 2007/0106754 A1 | 5/2007 | Moore |
| 2007/0116036 A1 | 5/2007 | Moore |
| 2007/0116037 A1 | 5/2007 | Moore |
| 2007/0130457 A1 | 6/2007 | Kamat et al. |
| 2007/0139182 A1 | 6/2007 | O'connor et al. |
| 2007/0143215 A1 | 6/2007 | Willems |
| 2007/0150482 A1 | 6/2007 | Taylor et al. |
| 2007/0156809 A1 | 7/2007 | Dickinson et al. |
| 2007/0168461 A1 | 7/2007 | Moore |
| 2007/0207782 A1 | 9/2007 | Tran |
| 2007/0220016 A1 | 9/2007 | Estrada et al. |
| 2007/0225047 A1 | 9/2007 | Bakos |
| 2007/0245020 A1 | 10/2007 | Ott, IV |
| 2008/0005086 A1 | 1/2008 | Moore |
| 2008/0040151 A1 | 2/2008 | Moore |
| 2008/0046369 A1 | 2/2008 | Wood |
| 2008/0046437 A1 | 2/2008 | Wood |
| 2008/0046471 A1 | 2/2008 | Moore et al. |
| 2008/0052162 A1 | 2/2008 | Wood |
| 2008/0052343 A1 | 2/2008 | Wood |
| 2008/0126178 A1 | 5/2008 | Moore |
| 2008/0126476 A1 | 5/2008 | Nicholas et al. |
| 2008/0141126 A1 | 6/2008 | Johnson et al. |
| 2008/0195483 A1 | 8/2008 | Moore |
| 2008/0244091 A1 | 10/2008 | Moore et al. |
| 2009/0019063 A1 | 1/2009 | Gandhi et al. |
| 2009/0172773 A1 | 7/2009 | Moore |
| 2013/0104251 A1 | 4/2013 | Moore |
| 2013/0291060 A1 | 10/2013 | Moore |

FOREIGN PATENT DOCUMENTS

| | | |
|---|---|---|
| EP | 0504774 A2 | 9/1992 |
| GB | 901723 A | 7/1962 |
| JP | 06347169 A | 12/1994 |
| JP | 09145249 A | 6/1997 |
| WO | 8304161 A1 | 12/1983 |
| WO | 03077558 A2 | 9/2003 |
| WO | 2004015742 A2 | 2/2004 |
| WO | 2006083958 A2 | 8/2006 |
| WO | 2007011917 A2 | 1/2007 |
| WO | 2007130865 A2 | 11/2007 |
| WO | 2007137145 A2 | 11/2007 |
| WO | 2008036464 A2 | 3/2008 |

OTHER PUBLICATIONS

"Digital Imaging and Communications in Medicine(DICOM), Part 10: Media Storage and File Format for Media Interchange", PS Mar. 10, 2004, National Electronics Manufactures Association, Rosslyn, Virginia, Oct. 2004, pp. 1-33.

"Drugs and Herbs", WebMD Health—Drug, available at Indexhttp://web.archive.org/web/20051101101459/http://www.webmd.com/drugs/index-drugs.aspx, (accessed online Jul. 11, 2011), Nov. 2005, 45 pages.

"Outline Processor Markup Language, OPML 1.0 Specification", available at http://www.opml.org/spec, (accessed online Jul. 5, 2011), Sep. 9, 2000, 6 pages.

"Serve", Chambers 21st Century Dictionary. London: Chambers Harrap. Credo Reference [online][retrieved on Jul. 10, 2011], 2001, 1 page.

"Service", Chambers 21st Century Dictionary. London: Chambers Harrap. Credo Reference. [online][retrieved on Jul. 10, 2011], 2001, 1 page.

"The DICOM Standard", available at http://www.cabiatl.com/mricro/dicom/index.html, (acessed online Oct. 3, 2012), 6 pages.

"W3Schools Online Web Tutorials", 2002, 6 pages.

U.S. Appl. No. 11/458,092, Non-Final Office Action mailed Jun. 9, 2008, OARN, 22 pages.

U.S. Appl. No. 11/615,030 Non Final Office Action mailed Jan. 23, 2008, all, Jan. 23, 2008, 15 pages.

Appnel, Timothy, "RSS: The Web Services We Already Have", http://www.oreillynet.com/xml/blog/2003/01/rss_the_web_service_we_already.html, (accessed online May 29, 2008), Jan. 22, 2003, 2 pages.

Definition, "application programming interface", Computer Dictionary, 5th Edition, Microsoft Press, Redmond, WA, May 1, 2002, pp. 33, 3 pages.

Definition, "graphical user interface", Computer Dictionary, 5th Edition, Microsoft Press, Redmond, WA, May 1, 2002, pp. 239, 3 pages.

Definition, "interface", Computer Dictionary, 5th Edition, Microsoft Press, Redmond, WA, May 1, 2002, pp. 279-280, 4 pages.

Definition, "Metadata", Webster's New World Computer Dictionary, 2003, 1 page.

FEMA, "FEMA: Federal Disaster Declarations RSS", FEMA.gov, available at http://web.archive.org/web/20050413031904/http://fema.gov/news . . . , (accessed online Dec. 29, 2010), 1 page.

FEMA, "FEMA: News Releases", available at web.archive.org/web/20050403173625/www.fema.gov/news/recentnews_rss.fema, (accessed online Jul. 5, 2011), Apr. 3, 2005, 2 pages.

FEMA, "FEMA: RSS(Really Simple Syndication)", available at web.archive.org/web/20050416033644/http://www.fema.gov/help/res.shtm, (accessed online Jul. 5, 2011), Apr. 16, 2005, 2 pages.

Gawlick, Dieter et al., "Using the Oracle Database as a Declarative RSS Hub", International Conference on Management of Data, Proceedings of the 2006 ACM SIGMOD international conference on Management of data, 2006, p. 722.

Hammond, Tony et al., "The Role of RSS in Science Publishing", D-Lib Magazine, vol. 10, No. 12, Dec. 2004, pp. 1-17.

Kifer, Michael et al., "Database Systems: An Application-Oriented Approach", Second Edition, Boston, MA: Pearson Education Inc., 2005, pp. 1151-1152.

(56) References Cited

OTHER PUBLICATIONS

Krill, Paul, "Microsoft to demo CRM-RSS", http://weblog.infoworld.com/techwatch/archives/003933.html, (accessed online Jun. 25, 2007), Sep. 7, 2005, 3 pages.

Lewin, James, "An Introduction to RSS news feeds: Using open formats for content syndication", available at http://www.opensourcetutorials.com/tutorials/Server-Side-Coding/Perl/perl-rss-news-feed/page1.html, (accessed online Jul. 5, 2011), Apr. 5, 2004, 11 pages.

Lund, Ben, "Using Urchin, Notes for Webmasters", Urchin version 0.8, 2003, 8 pages.

Marshall, James, "HTTP Made Really Easy", A Practical Guide to Writing Clients and Servers, available at http:www.jmarshall.com/easy/http/, (accessed online Jul. 12, 2011), Aug. 15, 1997, 21 pages.

Maurer, L., "U.S. Appl. No. 09/584,318 (Appendix)" Nov. 1, 2012 Mark As Don't Cite—Issued Patent, Nov. 1, 2012 Mark As Don't Cite—Issued Patent, Nov. 1, 2012 Mark As Don't Cite—Issued Patent.

Nakano, Yusuke et al., "A proposal of RSS WebCrawler model of product information", IEEE, Proceedings of the 2005 International Conference on Active Media Technology, May 2005, pp. 147-151.

Oaiss, "UDDI Version 2.04 API Specification", UDDI Spec TC, available at http://www.uddi.org/pubs/ProgrammersAPI-V2.04-Published_20020719.htm, accessed online Jul. 5, 2011, Jul. 19, 2002, pp. 1-66.

Pande, Nitin, "System.xml.xmlSerializer", as found on the EggHeadCafe.Com website, http://www.eggheadcafe.com/articles/system.xml.xmlserialization.asp, (accessed online Nov. 5, 2012), Dec. 8, 2004, 4 pages.

International Application Serial No. PCT/US2006/003544, International Search Report mailed, Sep. 17, 2008, 3 pages.

International Application Serial No. PCT/US2006/003544, Written Opinion mailed, Sep. 17, 2008, 3 pages International Application Serial No. PCT/US2006/003544, International Preliminary Report on Patentability mailed, Sep. 17, 2008, 7 pages.

International Application Serial No. PCT/US2006/027794, International Search Report mailed, Nov. 26, 2007, 3 pages.

International Application Serial No. PCT/US2006/027794, Written Opinion mailed, Nov. 26, 2007, 6 pages.

International Application Serial No. PCT/US2006/027794, International Preliminary Report on Patentability Issued, Jan. 16, 2008, 7 pages.

International Application Serial No. PCT/US2006/034944, International Search Report mailed, Mar. 19, 2007, 5 pages.

International Application Serial No. PCT/US2006/034944, Written Opinion mailed, Mar. 19, 2007, 7 pages.

International Application Serial No. PCT/US2006/034944, International Preliminary Report on Patentability Issued, Mar. 11, 2008, 8 pages.

International Application Serial No. PCT/US2007/067643, International Search Report mailed, Jun. 30, 2008, 1 page.

International Application Serial No. PCT/US2007/067643, Written Opinion mailed, Jun. 20, 2008, 5 pages.

International Application Serial No. PCT/US2007/067643, International Preliminary Report on Patentability Issued, Nov. 4, 2008, 6 pages.

International Application Serial No. PCT/US2007/069195, International Search Report mailed, Sep. 2, 2008, 3 pages.

International Application Serial No. PCT/US2007/069195, Written Opinion mailed, Sep. 2, 2008, 5 pages.

International Application Serial No. PCT/US2007/069195, International Preliminary Report on Patentability Issued, Nov. 18, 2008, 6 pages.

International Application Serial No. PCT/US2007/074475, International Search Report mailed, Jun. 30, 2008, 1 page.

International Application Serial No. PCT/US2007/074475, Written Opinion mailed, Jun. 30, 2008, 3 pages.

International Application Serial No. PCT/US2007/074475, International Preliminary Report on Patentability Issued, Jan. 27, 2009, 4 pages.

Pilgrim, Mark, "How to consume RSS safely", available at http://diveintomark.org/archives/2003/06/12/how_to_consume_rss_safely, (accessed on Jul. 5, 2011), 2003, pp. 1-28.

Ponnekanti, Shankar R. et al., "SWORD: A Developer Toolkit for Web Service Composition", available at http://www2002.org/CDROM/alternate/786/, (accessed online Jul. 5, 2011), 2002, pp. 1-22.

Roszkowski, et al., "A Distributed Architecture for Resource Discovery Using Metadata", D-Lib Magazine, Jun. 1998, pp. 1-11.

Scheier, Bruce, "Applied Cryptography: Protocols, Algorithms, and Source Code in C", John Wiley & Sons, Inc., Second Edition, 1996, pp. 584-587.

Sourceforge.Net, "Urchin RSS Aggregator, version 0.92", available at http://urchin.sourceforge.net/index.html, accessed online Jun. 2, 2009, 2004, pp. 1-5.

Stal, Michael, "Web Services: Beyond Component Based Computing Seeking a Better Solution to the Application Integration Problem", Communications of the ACM, vol. 45, No. 10, Oct. 2002, pp. 71-76.

W3C, "RDF Primer", W3C Recommendation, available at http://www.w3.org/TR/rdf-syntax/, (accessed online Jul. 5, 2011), Feb. 10, 2004, pp. 1-73.

W3C, "XML Encryption Syntax and Processing", W3C Recommendation, available at: http://www.w3.org/TR/xmlenc-core/, (accessed online Nov. 5, 2012), Dec. 10, 2002, 46.

Winer, Dave, "OPML(Outline Processor Markup Language) About Page", available at http://ww.opml.org/about, (accessed online Jul. 5, 2011), Nov. 7, 2000, 2 pages.

Wood, Charlie, "Adoption Salesforce.com via RSS", http://globelogger.com/item.php?id=294, (accessed online Jun. 25, 2007), Feb. 6, 2005, 3 pages.

Wood, Charlie, "Adoption Using RSS to Track Sales Leads", http://globelogger.com/item.php?id=285, (accessed online Jun. 25, 2007), Jan. 28, 2005, 3 pages.

Wood, Charlie, "Blog of Subscribe Your Calendar to Your Salesforce.com Events", http://globelogger.com/item.php?id=660, (accessed online Jun. 25, 2007), May 12, 2006, 2 pages.

Wood, Charlie, "Introducing Spanning Feed Builder for AppExchange", http://www.spanningpartners.com/2006/07/introducing_spa.html, (accessed online Jun. 25, 2007), Jul. 2, 2006, 3 pages.

Wood, Charlie, "Introducing Spanning Salesforce 2.0", http://www.spanningpartners.com/2005/08/introducing_spa.html, (accessed online Aug. 21, 2007), Aug. 28, 2005, 4 pages.

Wood, Charlie, "Latest Spanning Salesforce Release", http://www.spanningpartners.com/2006/04/latest_spanning.html, (accessed online Jun. 25, 2007), Apr. 5, 2006, 3 pages.

Wood, Charlie, "New Spanning Salesforce Feeds and Features", http://globelogger.com/item.php?id=606, (accessed online Jun. 25, 2007), Mar. 14, 2006, 2 pages.

Wood, Charlie, "On Creating Real Business Value with RSS", http://www.spanningpartners.com/2006/02/on_creatinq_rea.html, (accessed online Jun. 25, 2007), Feb. 23, 2006, 3 pages.

Wood, Charlie, "RSS-Enabled AppExchange Applications", http://www.spanningpartners.com/2006/05/spanning_partne_1.html, (accessed online Jun. 25, 2007), May 30, 2006, 3 pages.

Wood, Charlie, "Spanning Salesforce 2.0 is Live", http://globelogger.com/item.php?id=466, (accessed online Jun. 25, 2007), Aug. 28, 2005, 2 pages.

Wood, Charlie, "Spanning Salesforce Goes Public", http://globelogger.com/item.php?id=285, (accessed online Jun. 25, 2007), Jul. 17, 2005, 3 pages.

Wood, Charlie, "Subscribe Your Calendar to Your Salesforce.com Events", http://www.spanningpartners.com/2006/05/subscribe_your.html, (accessed online Jul. 12, 2011), May 12, 2006, 1 page.

\* cited by examiner

USING RSS ARCHIVES

CLAIM OF PRIORITY

This application is a continuation of U.S. Nonprovisional application Ser. No. 12/233,266, entitled USING RSS ARCHIVES, filed Sep. 18, 2008 ('266 Application), now U.S. Pat. No. 8,140,482. The '266 Application claims priority under 35 USC §119(e) to provisional U.S. Patent Application Ser. 60/973,480, filed on Sep. 19, 2007 and to provisional U.S. Patent Application Ser. 61/082,802, filed on Jul. 22, 2008, the entire contents of which are hereby incorporated by reference.

TECHNICAL FIELD

Using data feed archives such as RSS archives is described herein.

Internet searching has attracted significant activity aimed at improving the speed, scope, and relevance of search results. Some companies have also leveraged popular search engines into related areas such as targeted advertising and specialty searches. Beneath these web-based or programming-interface-based search systems lay technologies for locating content, indexing content, and determining the relevance of content in response to particular search requests. Often such systems focus on finding content among the billions of web pages and other content items on the World Wide Web.

As RSS becomes an increasingly popular medium for Internet communications and communities, there as an increasing need to store and index historical RSS data. A system and method for searching content specific sources, metadata sources, and distribution channels such as archived RSS datafeed information is described herein.

Several types of archival formats may be usefully employed for RSS.

In one aspect, an archival format may permit full reconstruction of any historical RSS feed. The archived data may include time-stamping or other certification of time so that publication dates are accurately and non-repudiatably preserved.

In another aspect, an archival format may extract and more efficiently store elements of an RSS feed, such as text, enclosures, and the like. This data may be stored according to relevant tags, with certain tags and tagged content being removed. In another aspect, the original RSS content may be processed for archiving. For example, the text portion may be enhanced based on what appears in HTML source code for an item, or from a feed.

It will be understood that the archival format may be standardized so that a corresponding database will include suitable fields or indices for generalized or specific post-archiving uses. For example, time stamps may be used as noted above. As another example, certain feed or item metadata from the HTML code may be extracted and stored with item content. In particular, information such as source information, author, unique ID or permalink data, and so forth, may be extracted in order to uniquely identify RSS text after surrounding HTML or XML based metadata has been removed for archiving.

The extracted data may be added directly to a text form of the item for archiving. In another aspect, the extracted data may be stored in a suitably configured relational database or other storage medium.

It will be further appreciated that the archival format may be supplemented with additional data not present in the feed or item HTML. For example, semantic metadata may be generated relating to popularity, subject matter, usage, or other characteristics of a particular item, or a feed from which the item was obtained.

An archive may be adapted for specific or general use. For example, a market-specific archive (e.g., real estate, medical, financial, and so forth) may be created that is supplemented with relevant metadata. And for each market, certain existing metadata may be retained in the archival format or dispensed with entirely.

In some aspects, a method includes processing two or more independent RSS data feeds to generate two or more RSS market specific searchable RSS datafeed archives. The method also includes generating, using a master probe device, a probe plan based on an input received from a user. The method also includes applying, using a plurality of slave probe devices, at least two different probes to the archives to derive information based on data in the searchable RSS datafeed archives, the probes being part of the probe plan to determine a result based on the derived information. At least one of the probes is applied to at least two of the searchable RSS datafeed archives and at least two of the probes are applied to the same searchable RSS datafeed archive. The method also includes determining the result based on the derived information and generating an RSS feed that includes the result.

Embodiments can include one or more of the following.

The market specific datafeed archives can include one or more of a real estate datafeed archive, a medical datafeed archive and a financial datafeed archive.

Processing the two or more independent data feeds can include storing metadata and an automatically generated importance value.

Generating the probe plan can include using a master engine to generate the probe plan.

Determining the result can include receiving sub-results from one or more of the at least two different probes, the sub-results differing in structure and format, and combining the sub-results to generate the result.

Combining the sub-results can include identifying a first sub-result that is a duplicate or near duplicate of a second sub-result and generating a hyperlink to the second sub-result.

In some additional aspects, a method includes processing two or more independent data feeds to generate two or more searchable datafeed archives. The method also includes applying at least two different probes to the archives to derive information based on data in the archives, the probes being part of a probe plan to determine a result based on the derived information, at least one of the probes being applied to at least two of the archives. The method also includes determining the result based on the derived information and providing the result for use in a real-world application.

Embodiments can include one or more of the following.

The searchable datafeed archives can include RSS searchable datafeed archives.

Processing the two or more independent datafeeds can include processing the two or more independent datafeeds to generate market specific datafeed archives.

The market specific datafeed archives can include one or more of a real estate datafeed archive, a medical datafeed archive and a financial datafeed archive.

Processing the two or more independent data feeds can include storing metadata and an automatically generated importance value.

The method can also include generating the probe plan based on an input received from a user.

Generating the probe plan can include using a master engine to generate the probe plan.

The probes can have differing structures.

Determining the result can include receiving sub-results from one or more of the probes, the sub-results differing in structure and format. The method can also include combining the sub-results to generate the result. Combining the sub-results can include identifying a first sub-result that is a duplicate or near duplicate of a second sub-result and generating a hyperlink to the second sub-result.

Providing the result can include generating an RSS feed that includes the result.

In some additional aspects, a method includes generating, based on a probe plan and a search request, probes, the probes differing from one another and configured to search market specific searchable datafeed archives. The method also includes receiving, in response to the probes, sub-results from one or more of the probes. The method also includes determining a result based on the sub-results and providing the result for use in a real-world application.

Embodiments can include one or more of the following.

The searchable datafeed archives can be RSS searchable datafeed archives.

The market specific datafeed archives can include one or more of a real estate datafeed archive, a medical datafeed archive and a financial datafeed archive.

The probes can have differing structures.

Determining the result can include receiving sub-results from one or more of the probes, the sub-results differing in structure and format. The method can also include combining the sub-results to generate the result.

Providing the result can include generating an RSS feed that includes the result.

It will be understood that while RSS is used herein as a convenient and commonly used example of an XML-based and syndication-ready grammar, other XML-based systems may be suitably archived using the techniques described herein including without limitation other syndication technologies (such as Atom) and other grammars such as OPML for outlining and so forth.

Metadata may be extracted from an RSS channel description, or from a particular RSS item. This includes any metadata encoded in the HTML associated with an RSS item. This metadata may be directly extracted for storage, or may be analyzed by an analysis engine for purposes of filtering, enriching, or otherwise processing the metadata to produce new metadata associated with the item (or the channel). However obtained, a selected portion of extracted or derived metadata may be stored with an RSS archival format.

Content, typically text but also including enclosures of any form or other content contained within an RSS item, may also be extracted for storage in the archival format. In addition, the content may itself be analyzed by the analysis engine, and metadata may be generated based upon the content either alone or in combination with other available metadata, for storage with the other metadata of the archival format.

The archival format may take any suitable form including an archival XML grammar, a simple text document (which may be subject to one or more constraints to preserve archival metadata such as key value pairs, metadata delimiters, or the like). The archival format may also be preserved in a suitably constructed database which may be indexed, for example, by content, metadata, or a combination of these.

All such variations and others may be employed with the systems described herein.

These and other aspects and features, and combinations of them, may be expressed as methods, apparatus, systems, program products, databases, methods of doing business, and means for performing functions, and in other ways.

Other aspects and features will become apparent from the following description and from the claims.

DETAILED DESCRIPTION

Figure 1:
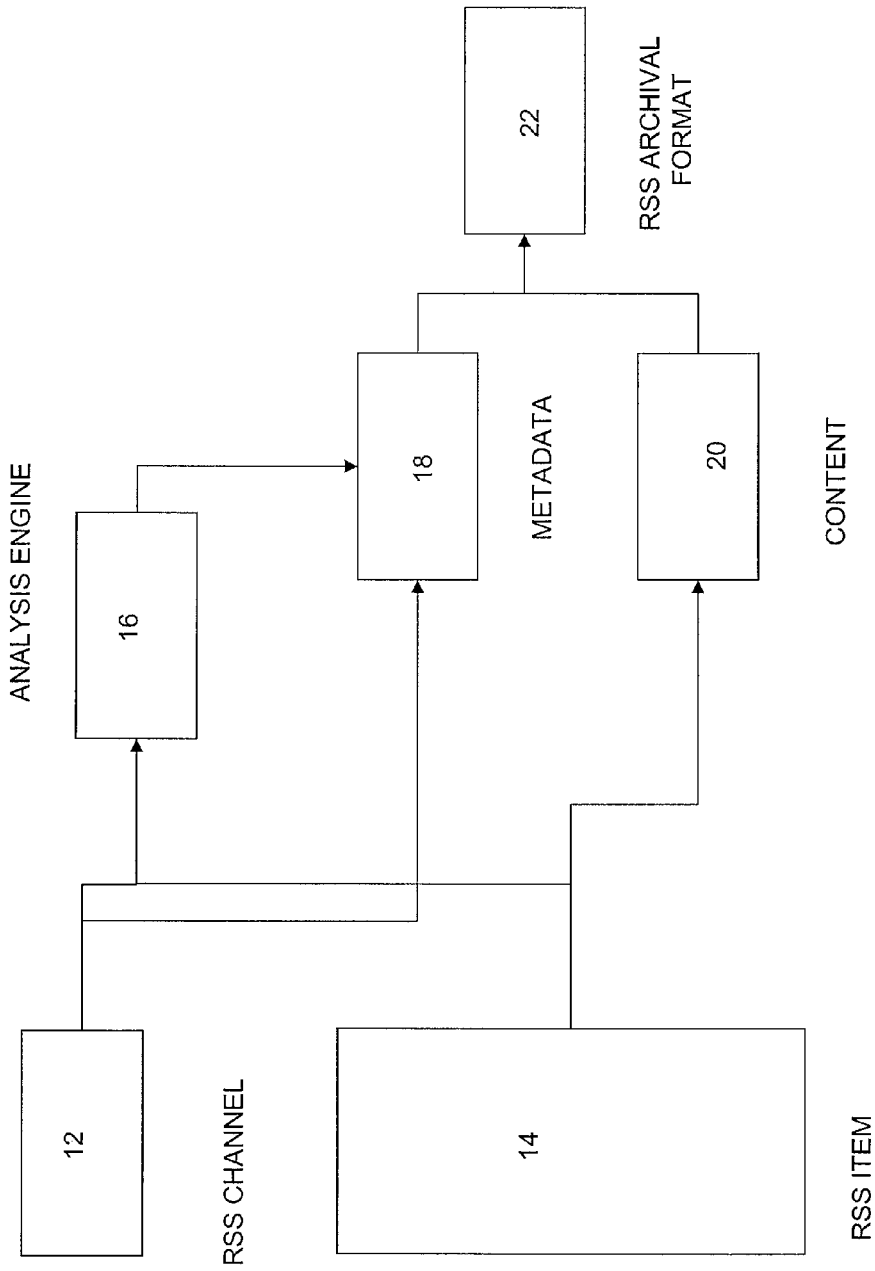
FIG. 1 is a block diagram of an RSS archive system.

Referring now to FIG. 1, an RSS channel 12 may comprise an XML data feed in the RSS format, the Atom format, or any and all other suitable formats. The RSS channel 12 may comprise one or more RSS items 14, which may encompass data structures that are formatted according to the RSS 2.0 specification, the Atom specification, or any and all other suitable specification. In embodiments, such specifications may be expressed in DTD, XML Schema, or any and all other schema language or the like. Each RSS item may encompass content 20 such as and without limitation bits, bytes, strings, binaries, and so on. In embodiments, the content 20 may be organized into elements, each of which may be associated with a data type and/or a unique identifier.

Any and all instances of content 20 (and, therefore, any and all instances of an RSS channel or item) may comprise or be associated with metadata 8. In embodiments, an analysis engine 16 may process instances and generate the metadata 8 as a result of the processing. This processing may be entirely automatic, such as and without limitation according to an algorithm, heuristic, or the like. For example and without limitation, the automatic processing may recognize that many instances contain a hyperlink to a particular instance. Based upon this recognition the automatic processing may generate metadata 18 indicating that the particular instance is relatively important. Alternatively, this processing may include accepting a human input. For example and without limitation, the human input may comprise a tag that is associated with a folksonomy, collaborative tagging, social classification, social indexing, social tagging, or the like. Many examples of automatic processing and processing that accepts a human input will be appreciated and all such examples (and others) are intended to fall within the scope of the claims.

An RSS archival format 22 may specify embodiments of RSS items and/or RSS channels in association with metadata. In embodiments, an RSS archive may comprise data that is formatted according to the RSS archival format. It will be appreciated that such data could be stored in a database, a flat file system, a data stream, and so on. An example RSS archive, provided for the purpose of illustration and not limitation, is as follows:

```
<?xml version="1.0"?>
<rss version="2.0+metadata">
  <channel>
    <metadata class="automatic" style="importance">
      <importance>8</importance>
      <date-rated>10/27/06</date-rated>
    </metadata>
    <title>Example Channel</title>
    <link>http://example.com/</link>
    <description>My example channel</description>
    <item>
```

-continued

```
    <title>News for April the First</title>
    <link>http://example.com/2006/04/01</link>
    <description>Cats overran the city today</description>
    <metadata class="human-input" style="folksonomy">
      <tag>cats</tag>
      <tag>humor</tag>
    </metadata>
  </item>
  <item>
    <title>News for September the Second</title>
    <link>http://example.com/2006/09/02</link>
  </item>
 </channel>
</rss>
```

In the foregoing example, an RSS 2.0 feed includes an RSS channel and the RSS channel includes two RSS items. The RSS channel includes an instance of metadata, the metadata being of class "automatic" and style "importance". An automatic process of the analysis engine may generate this metadata. This metadata contains two elements, one of type "importance" and the other of type "date-rated". The importance element may be a score on 1-to-10 scale and the date-rate element may be the date on which the automatic process determined the importance. One of the RSS items also includes an instance of metadata, the metadata being of class "human-input" and style "folksonomy". A process of the analysis engine 16 and that accepts human input may generate this metadata. This metadata contains two elements, both of which are of type "tag". Each of these elements contain values ("cats" and "humor") that may have been provided to the automatic process by a human. In light of the foregoing example instance of an RSS archive, innumerable RSS archival formats will be appreciated and all such formats (and others) are intended to fall within the scope of the claims.

Figure 2:
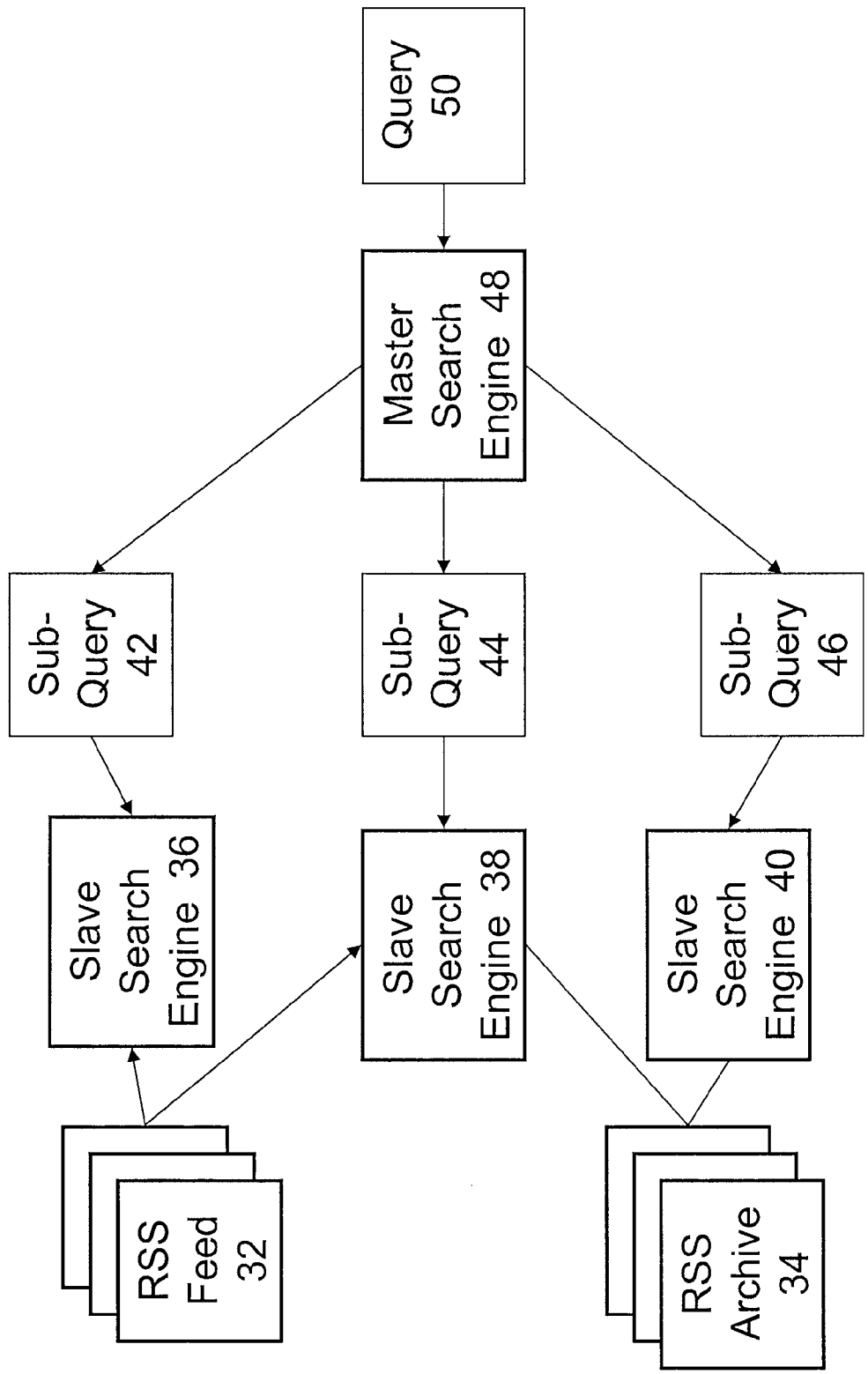
FIG. 2 is a block diagram of a system searching RSS feeds and RSS archives.

Referring now to FIG. 2, systems and methods for searching RSS feeds 32 and RSS archives 34 may comprise a plurality of RSS feeds, a plurality of RSS archives 34, a plurality of slave search engines, (e.g., slave search engines 36, 38 and 40), a plurality of sub-queries 32, (e.g., subqueries 42, 44 and 46), a master search engine 49, and a query 50. Some of the slave search engines, for example engines 36 and 38, may receive at least one of the RSS feeds 32. Some of the slave search engines, for example engines 38 and 40, may be associated with at least one of the RSS archives 34. Some of the slave search engines, for example engine 38, may both receive at least one of the RSS feeds 32 and be associated with at least one of the RSS archives 34.

The master search engine 46 may receive a query 50. The query 50 may be a structured query, an unstructured query, an XML query, an SQL query, and so on. In embodiments, a user or an automatic process may provide the query 50. For example and without limitation, a user may be interested in accessing all RSS items that relate to cats. The user may transmit a free-form text string (for example: "tuxedo cats") to the master search engine. The master search engine may receive this text string as the query.

In response to the query 50, the master search engine 48 may devise a query plan that involves communicating at least one sub-query, (e.g., one of queries 42, 44 and 46), to at least one of the slave search engines (36, 38, 40). The sub-queries 42, 44, and 46 may be formatted according to any and all query languages and formats. In embodiments, the master search engine 48 may submit the sub-queries 42, 44 and 46 to the slave search engines 36, 3 8 and 40 via SOAP, via a REST-ful interface, via an API, via a remote procedure call, and so on. In embodiments, the master search engine 48 may be operatively coupled to the slave search engines 36, 38 and 40 via the Internet, a public network, a private network, a virtual private network, and so on. In embodiments, the master search engine 48 and the slave search engines 36, 38 and 40 may operate under separate administrative control and the sub-queries 42, 44 and 46 may be transmitted via a public interface, a protected interface, a private interface, or the like.

In embodiments, the slave search engines 36, 38 and 40 may exist as public services that are operated independently from one another. For example and without limitation, the following RSS search engines may be employed as slave search engines: Bloglines, BlogPulse, Daypop, Feedster, Findory Blogory, Gigablast Blog Search, IceRocket Blog Search, PubSub, and Technorati. In addition, slave search engines may include proprietary archives of RSS content that are not open to public use, or that require registration, login, subscription fees, or the like. Each of the slave search engines may implement an interface, query format, feature set, search capability, or the like that differs from another one of the slave search engines.

In embodiments, the master search engine 44 may encompass a library or collection of bridges, adaptors, converters, interfaces, or the like that enable the master search engine to communicate sub-queries in a plurality of query formats and with respect to a plurality of interfaces, feature sets, search capabilities, and the like. In any case, the master search engine may prepare a plurality of sub-queries in response to the query 50. Each of the sub-queries 42, 44 and 46 may be tailored to one of the slave search engines 36, 38 and 40. The master search engine 48 communicates the sub-queries 42, 44 and 46 to the corresponding slave search engines 36, 38 and 40.

While in the example described above in relation to FIG. 2, three slave search engines and three sub-queries have been described, any number of save search engines can be associated with the master search engine and each slave engine can receive one or more sub-queries.

Figure 3:
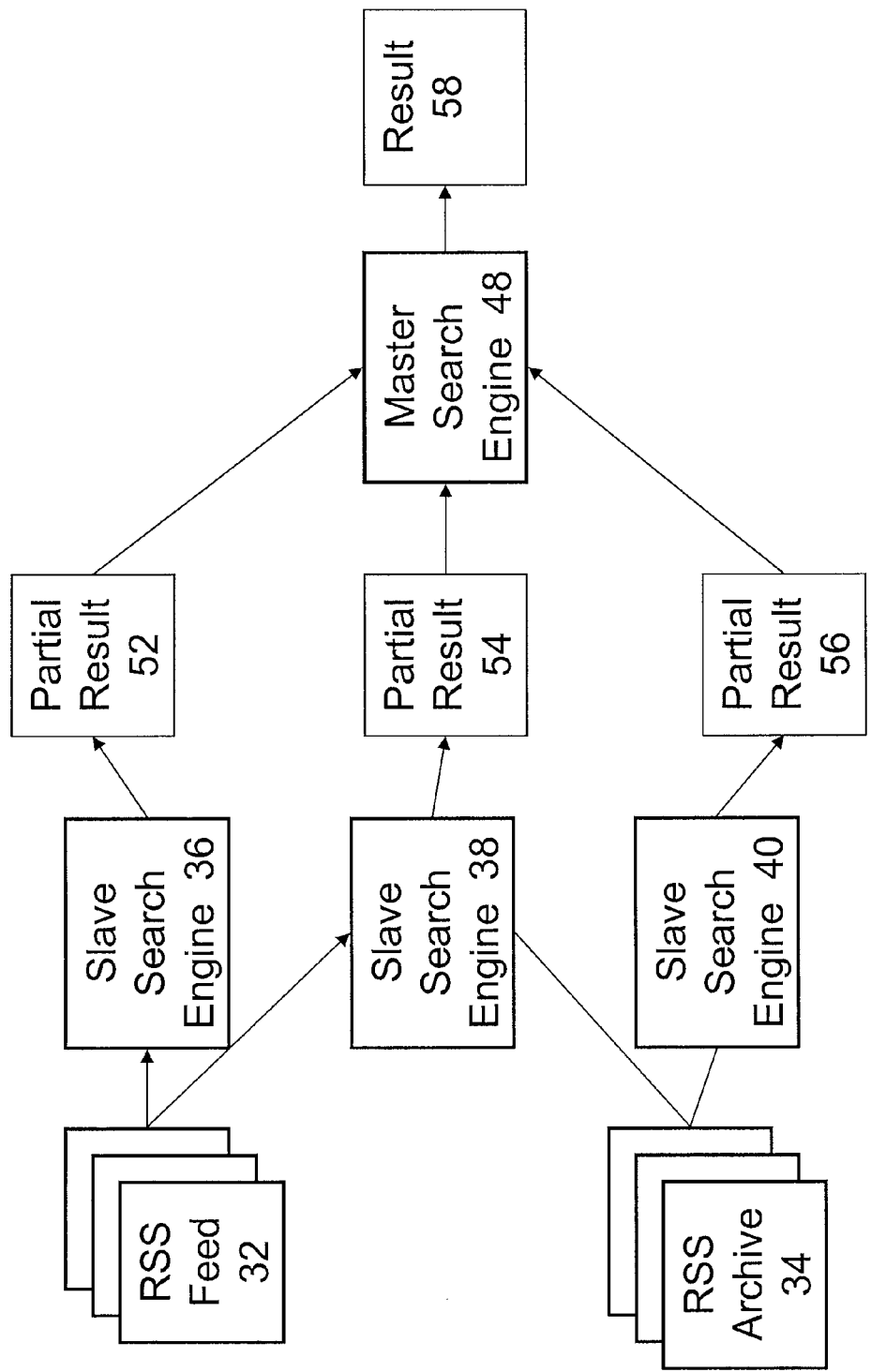
FIG. 3 is a block diagram of a system searching RSS feeds and RSS archives.

Referring now to FIG. 3, each of the slave search engines 36, 38 and 40 may generate a partial result, (e.g., partial results 52, 54 and 56), in response to the sub-query that it received. As with the sub-queries, each of the partial results 52, 54 and 56 may be formatted or structured in a way that differs from another partial result. The master search engine 48 receives the partial results 52, 54 and 56 from the slave search engines 36, 38 and 40. The library or collection of bridges, adaptors, converters, interfaces, or the like that enable the master search engine 48 to communicate sub-queries may also enable the master search engine 48 to receive partial results 52, 54 and 56 from a plurality of slave search engines 36, 38 and 40 and in a plurality of formats.

Any and all of the partial results may comprise metadata, RSS feeds, RSS archives, RSS items, XML, or any and all other forms of data. The master search engine 48 may combine some or all of the partial results 52, 54 and 56 into a single result 58, which itself may comprise a plurality of elements. This result may be formatted as an HTML page, an RSS feed, a database table, a combination of any and all of the foregoing, or the like. All together, the partial results may contain duplicate or near-duplicate RSS items, RSS feeds, RSS archives, and the like. To compensate for this, embodiments of the result may contain one element that is representative of the duplicate or near-duplicate elements plus a hyperlink or the like that is associated with this one element, the hyperlink providing access to all of the duplicate or near-duplicate elements of this one element.

Embodiments of the master search engine may provide a web portal with an HTML form or the like into which a user may enter a query. Embodiments of the master search engine may provide an API or programmatic interface for communicating queries and results.

Archiving Content

Various services may be provided based upon a content archive, which may include archiving for RSS data, HTML data, OPML data, or any other XML data and the like, as well as media and other content files associated with any of the foregoing.

In one aspect, a search engine may be provided that spans multiple archives of RSS content. Thus, where multiple archives exist for content, a meta search engine may be provided to span content in all such archives. This may include searching of archives provided by various RSS content providers, as well as independent or third-party archives discovered and explored using, e.g., spiders, link analysis, and so forth.

Another service may provide user-configurable archiving. In one aspect, this provides a user with a persistent store of data for one or more RSS feeds or the like, so that content of interest can be preserved regardless of the persistence of the feed source. Such archives may be prepared based upon original source content, aggregated content, and so forth. In creating such an archive, a user may specify one or more sources, and may specify archiving parameters such as frequency of archiving (e.g., hourly, daily, weekly, monthly, etc.), storage capacity, link depth (such as whether and how links within an archived item are navigated/stored), and so forth. A user may also specify access credentials for secure content where appropriate.

More generally, any web content may be periodically archived under user control. Thus, for example, a user may specify locations of interest and have these locations periodically archived to provide both persistence and a time-based view of content at these locations. This service may be usefully employed, for example, to archive a user's web content such as social networking pages, professional web sites, and so forth. The service may also, or instead, be usefully employed to periodically capture competitive data, time-based commentary, subject-matter-based news items, and so forth, any or all of which may be archived for subsequent retrieval and review by the user. Archiving instructions may also include, for example, login credentials or the like for accessing proprietary content of the user, or content to which the user is a paid subscriber. The system may usefully explore links within archived content, and archive some or all of the linked content as well. This link depth may be specified by the user in either absolute terms (e.g., archive one-link content, two-link content, etc.), or in relative terms (e.g., all links within domain, all links having a certain path, etc.). In one embodiment, such a service may be used in a content management system to archive and/or audit content on a website or the like.

In one aspect, a web archiving service may be combined with a desktop backup client so that a user can specify, within a single interface, both local files and remote content for archiving within a single interface or operation.

The system described herein can be implemented in digital electronic circuitry, or in computer hardware, firmware, software, web-enabled applications, or in combinations thereof. Data structures used to represent information provided by the patient can be stored in memory and in persistence storage. Apparatus of the invention can be implemented in a computer program product tangibly embodied in a machine-readable storage device for execution by a programmable processor and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired, and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files, such devices include magnetic disks, such as internal hard disks and removable disks magneto-optical disks and optical disks. Storage devices suitable for tangibly embodying computer program instructions and data include all forms of non-volatile memory, including, by way of example, semiconductor memory devices, such as EPROM, EEPROM, and flash memory devices; magnetic disks such as, internal hard disks and removable disks; magneto-optical disks; and CD_ROM disks. Any of the foregoing can be supplemented by, or incorporated in, ASICs (application-specific integrated circuits).

Other implementations are within the scope of the following claims.

What is claimed is:

1. A method comprising:
processing two or more independent RSS data feeds to generate two or more RSS searchable datafeed archives;
marking desired data to facilitate searching and retrieval for the desired data;
generating a search plan based on an input from a user;
applying at least two different sub-queries of the search plan to the two or more RSS searchable datafeed archives to derive information based on data in the two or more RSS searchable datafeed archives,
wherein at least one of the sub-queries is applied to at least two of the searchable RSS datafeed archives and at least two of the sub-queries are applied to a same searchable RSS datafeed archive; and
determining a result of the search based on the derived information from the at least two different sub-queries.

2. The method of claim 1, further comprising generating metadata concerning the desired data that is marked.

3. The method of claim 1, further comprising formatting the RSS searchable datafeed archives.

4. The method of claim 3, further comprising generating and storing additional data not present in the two or more independent RSS feeds, the additional data relating to characteristics of the desired data or at least one of the independent RSS feeds.

5. The method of claim 1, further comprising generating and serving by a computer an RSS feed that includes the result.

6. The method of claim 1, further comprising providing the result by at least one computer server for use in a real world application.

7. The method of claim 1, wherein the RSS searchable datafeed archives are market-specific.

8. The method of claim 1, wherein the market-specific datafeed archives comprise one or more of a real estate datafeed archive, a medical datafeed archive and a financial datafeed archive.

9. The method of claim 1, wherein the information derived from each of the sub-queries differs in structure or format, and wherein determining the result requires combining the results from the sub-queries.

10. A method comprising:
generating a search plan based on an input from a user, the search plan comprising at least two sub-queries differing from each other in structure or format;
applying the at least two different sub-queries of the search plan to two or more RSS searchable datafeed archives to derive information based on data in the two or more RSS searchable datafeed archives,
wherein at least one of the sub-queries is applied to at least two of the searchable RSS datafeed archives and at least two of the sub-queries are applied to a same searchable RSS datafeed archive; and
determining a result of the search based on the derived information from the at least two different sub-queries.

11. The method of claim 10, further comprising processing two or more independent RSS data feeds to generate the two or more RSS searchable datafeed archives.

12. The method of claim 11, further comprising formatting the RSS searchable datafeed archives.

13. The method of claim 11, further comprising marking desired data from the two or more independent RSS data feeds to facilitate searching and retrieval for the desired data in the two or more RSS searchable datafeed archives.

14. The method of claim 13, further comprising generating metadata concerning the desired data that is marked.

15. The method of claim 11, further comprising generating and storing additional data not present in the two or more independent RSS feeds, the additional data relating to characteristics of the desired data or at least one of the independent RSS feeds.

16. The method of claim 10, further comprising generating and serving by a computer an RSS feed that includes the result.

17. The method of claim 10, further comprising providing the result by at least one computer server for use in a real world application.

18. The method of claim 10, wherein the RSS searchable datafeed archives are market-specific.

19. The method of claim 18, wherein the market-specific datafeed archives comprise one or more of a real estate datafeed archive, a medical datafeed archive and a financial datafeed archive.

* * * * *